United States Patent
Griffin et al.

(10) Patent No.: US 11,379,752 B1
(45) Date of Patent: Jul. 5, 2022

(54) QUBIT RESERVATION SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/332,198

(22) Filed: May 27, 2021

(51) Int. Cl.
*G06F 3/00* (2006.01)
*G06N 10/00* (2022.01)
*G06F 9/54* (2006.01)

(52) U.S. Cl.
CPC .............. *G06N 10/00* (2019.01); *G06F 9/54* (2013.01)

(58) Field of Classification Search
CPC .................................. G06N 10/00; G06F 9/54
USPC .......................................................... 719/310
See application file for complete search history.

(56) References Cited

U.S. PATENT DOCUMENTS

| | | | |
|---|---|---|---|
| 7,248,695 B1 | 7/2007 | Beal et al. | |
| 9,654,287 B2 | 5/2017 | Zhao et al. | |
| 10,776,544 B2 | 9/2020 | Delaney et al. | |
| 10,885,457 B2 | 1/2021 | Weichenberger | |
| 2013/0019051 A1* | 1/2013 | Somanache | G06F 12/0246 |
| | | | 711/E12.008 |
| 2018/0144262 A1 | 5/2018 | Roetteler et al. | |
| 2019/0394030 A1 | 12/2019 | Forbes et al. | |
| 2020/0074246 A1 | 3/2020 | Griffin et al. | |
| 2020/0128063 A1 | 4/2020 | Griffin et al. | |
| 2020/0201379 A1 | 6/2020 | Hogaboam et al. | |
| 2020/0334088 A1 | 10/2020 | Casillas et al. | |
| 2021/0019189 A1 | 1/2021 | Eker et al. | |
| 2021/0279628 A1* | 9/2021 | Noel | G06N 10/40 |

FOREIGN PATENT DOCUMENTS

| | | |
|---|---|---|
| CN | 108984301 B | 12/2020 |
| WO | 2020033974 A | 2/2020 |
| WO | 2020072819 A | 4/2020 |

OTHER PUBLICATIONS

She-Xiang Jiang, Cyclic Hybrid Double-Channel Quantum Communication via Bell-State and GHZ-State in Noisy Environments. (Year: 2019).*
Author Unknown, "Rigetti Computing Opens Their Quantum Cloud Service (QCS) for Public Beta," dotQuantum.io, 2018, dotquantum.io/en/dotquantum-news/rigetti-computing-opens-their-quantum-cloud-service-qcs-for-public-beta/, 3 pages.
Bartlett, S. et al., "Classical and quantum communication without a shared reference frame," arXiv:quant-ph/0302111v3, Jul. 8, 2003, 4 pages.

(Continued)

*Primary Examiner* — Lechi Truong
(74) *Attorney, Agent, or Firm* — Dority & Manning, P.A.

(57) ABSTRACT

Qubit reservation is disclosed. A first request to reserve at least one qubit is received from a requestor. The first request includes an application identifier (ID) of a first quantum application. Qubit metadata that describes characteristics of a first plurality of qubits implemented by a first quantum computing system is accessed to identify a first qubit that is available to be reserved. The qubit metadata is modified to reserve the first qubit to thereby inhibit access to the first qubit by any quantum application other than the first quantum application.

12 Claims, 13 Drawing Sheets

(56) References Cited

OTHER PUBLICATIONS

Cacciapuoti, A. et al., "When Entanglement Meets Classical Communications: Quantum Teleportation for the Quantum Internet," IEEE Transactions on Communications, vol. 68, Issue 6, Mar. 2020, 27 pages.
Chong, F. et al., "Programming languages and compiler design for realistic quantum hardware," Nature, vol. 549, Sep. 14, 2017, Macmillan Publishers Limited, pp. 180-187.
Johnston, E. et al., "Chapter 4. Quantum Teleportation," in Programming Quantum Computers, Jul. 2019, O'Reilly Media, Inc., oreilly.com/library/view/programming-quantum-computers/9781492039679/ch04.html, 20 pages.
Manzalini, A., "Quantum Communications in Future Networks and Services," Quantum Reports, vol. 2, Mar. 2020, MDPI, pp. 221-232.
Pang, X. et al., "Hacking Quantum Key Distribution via Injection Locking," arXiv:1902.10423v3 [quant-ph], Mar. 4, 2020, 10 pages.
Non-Final Office Action for U.S. Appl. No. 17/332,543, dated Apr. 5, 2022, 13 pages.

\* cited by examiner

QUBIT RESERVATION SERVICE

BACKGROUND

Qubits are a finite resource of a quantum computing system. A quantum application performs quantum operations on one or more qubits to implement a desired function. Multiple quantum applications may concurrently have a need for the qubits implemented by the quantum computing system.

SUMMARY

The examples disclosed herein implement a qubit reservation service that, upon request, reserves a number of qubits implemented on a quantum computing system for a future execution of a quantum application. While reserved, no other quantum applications will be allocated the reserved qubits. Subsequently, when the quantum application is submitted for execution on the quantum computing system, the quantum computing system determines that the qubits have been reserved for the quantum application, and allocates the reserved qubits to the quantum application for use.

In one example a method is provided. The method includes receiving, by a first computing system comprising a processor device from a requestor, a first request to reserve at least one qubit, the first request including an application identifier (ID) of a first quantum application. The method further includes accessing qubit metadata that describes characteristics of a first plurality of qubits implemented by a first quantum computing system to identify a first qubit that is available to be reserved. The method further includes modifying the qubit metadata to reserve the first qubit to thereby inhibit access to the first qubit by any quantum application other than the first quantum application.

In another example a computing device is provided. The computing device includes a memory and a processor device coupled to the memory to receive, from a requestor, a first request to reserve at least one qubit, the first request including an application ID of a first quantum application. The processor device is further to access qubit metadata that describes characteristics of a first plurality of qubits implemented by a first quantum computing system to identify a first qubit that is available to be reserved. The processor device is further to modify the qubit metadata to reserve the first qubit to thereby inhibit access to the first qubit by any quantum application other than the first quantum application.

In another example a non-transitory computer-readable storage medium is provided. The non-transitory computer-readable storage medium includes executable instructions to cause a processor device to receive, from a requestor, a first request to reserve at least one qubit, the first request including an application ID of a first quantum application. The executable instructions further cause the processor device to access qubit metadata that describes characteristics of a first plurality of qubits implemented by a first quantum computing system to identify a first qubit that is available to be reserved. The executable instructions further cause the processor device to modify the qubit metadata to reserve the first qubit to thereby inhibit access to the first qubit by any quantum application other than the first quantum application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
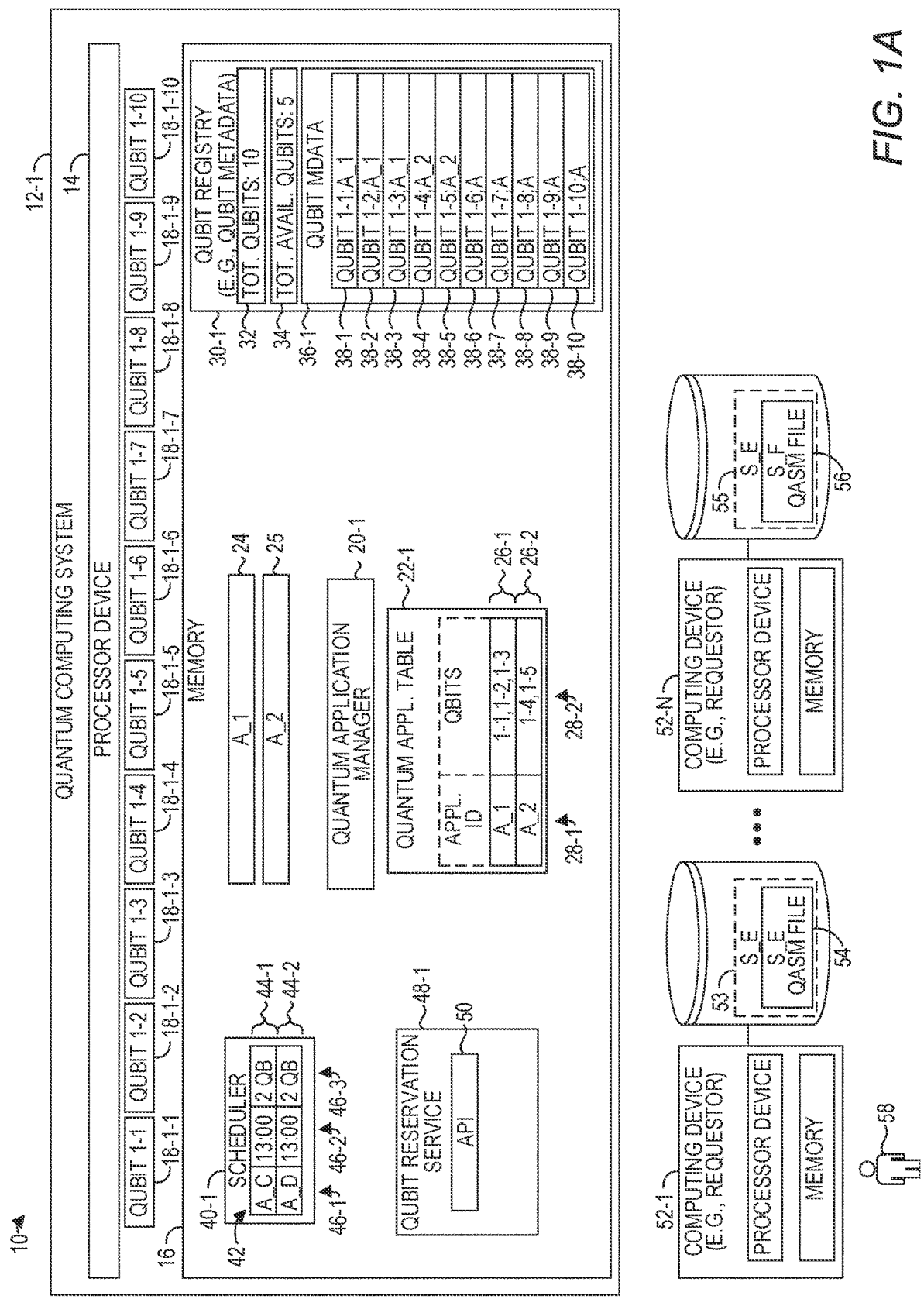
FIGS. 1A-1D are block diagrams illustrating an environment that is suitable for implementing qubit reservation according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Qubits are a finite resource of a quantum computing system. A quantum application performs quantum operations on one or more qubits to implement a desired function. Multiple quantum applications may concurrently have a need for the qubits implemented by the quantum computing system.

At the time of execution of a quantum application, the number of qubits utilized by the quantum application must be available, or the quantum application may not execute successfully, or at all. This can result in quantum applications that have been submitted to a quantum computing system to fail, or to never be initiated. In some environments, a quantum computing system may service a number of users who, from a classical computing device, submit quantum applications to the quantum computing system for execution. The users may have no way of knowing whether, at the time of submission, the quantum computing system has available qubits or not because the users may have no practical way of knowing what is executing on a quantum computing system at any given time.

The examples disclosed herein implement a qubit reservation service that, upon request, reserves a number of qubits implemented on a quantum computing system for a future execution of a quantum application. While reserved, no other quantum applications will be allocated the reserved qubits. Subsequently, when the quantum application is submitted for execution on the quantum computing system, the quantum computing system determines that the qubits have been reserved for the quantum application, and allocates the reserved qubits to the quantum application for use. When the quantum application terminates, the qubits may be returned to an available qubit pool for subsequent use, or reservation, by another quantum application. Among other advantages, the examples provide certainty that, when a quantum application executes at a future point in time, the quantum application will have the qubit resources necessary for execution.

FIG. 1A is a block diagram of an environment 10 in which examples may be practiced. The environment 10 includes a quantum computing system 12-1 that operates in a quantum environment but can operate using classical computing principles or quantum computing principles. When using quantum computing principles, the quantum computing system 12-1 performs computations that utilize quantum-mechanical phenomena, such as superposition and entanglement. The quantum computing system 12-1 may operate under certain environmental conditions, such as at or near 0° Kelvin. When using classical computing principles, the quantum computing system 12-1 utilizes binary digits that have a value of either 1 or 0.

The quantum computing system 12-1 includes one or more processor devices 14 and a memory 16. The quantum computing system 12-1 implements a plurality of qubits 18-1-1-18-1-10 (generally, qubits 18). The quantum computing system 12-1 is capable of initiating a plurality of different quantum applications. The term "quantum application" as used herein refers to an application that accesses one or more of the qubits 18-1-1-18-1-10 and provides some desired functionality. Each quantum application is implemented via a corresponding programming instruction file, which may comprise, for example a quantum assembly (QASM) file or any other suitable file capable of containing quantum programming instructions.

The quantum computing system 12-1 may include a quantum application manager 20-1 that orchestrates the initiation of and execution of quantum applications on the quantum computing system 12-1. While for purposes of illustration the quantum application manager 20-1 is illustrated as a single component, in practice the functionality described herein with regard to the quantum application manager 20-1 may be provided by a number of components executing on the quantum computing system 12-1.

The quantum application manager 20-1 may utilize a quantum application table 22-1 to maintain information regarding quantum applications executing on the quantum computing system 12-1. In this example, quantum applications 24 (A_1) and 25 (A_2) are currently executing on the quantum computing system 12-1. The quantum application table 22-1 maintains a row 26-1 that corresponds to the quantum application 24 and a row 26-2 that corresponds to the quantum application 25. The rows 26-1, 26-2 each have an application identifier field 28-1 that identifies the corresponding quantum application 24, 25 and a qubit identifier field 28-2 that identifies the specific qubits that are being utilized by the corresponding quantum application 24, 25. In this example, the row 26-1 indicates that the quantum application 24 is utilizing the qubits 18-1-1, 18-1-2 and 18-1-3 and that the quantum application 25 is utilizing the qubits 18-1-4 and 18-1-5.

The quantum computing system 12-1 maintains qubit metadata that corresponds to the qubits 18-1-1-18-1-10 in the form of a qubit registry 30-1. The qubit registry 30-1 maintains qubit metadata that describes characteristics of the qubits 18. The qubit metadata includes, by way of non-limiting example, a total qubits counter 32 that maintains track of the total number of qubits 18 implemented by the quantum computing system 12-1, in this example, ten qubits 18. The qubit metadata also includes a total available qubits counter 34 via which the quantum computing system 12-1 keeps track of the total number of qubits 18 that are currently available for allocation. The qubit registry 30-1 also maintains qubit metadata 36-1, which comprises a plurality of metadata records 38-1-38-10 (generally, metadata records 38), each of which maintains information about a corresponding qubit 18-1-1-18-1-10. The metadata records 38 may maintain any suitable and/or desirable information about a qubit 18, such as, by way of non-limiting example, whether the corresponding qubit 18 is currently allocated to a particular executing quantum application, and if so, the application identifier of the quantum application, whether the qubit 18 is available for allocation, and whether the qubit 18 has been reserved for future allocation to a quantum application that will be initiated at a future point in time.

In this example, the quantum computing system 12-1 includes a scheduler 40-1 that maintains a quantum schedule 42 that includes information about quantum applications that are scheduled to be executed at a future point in time. The quantum schedule 42 includes a plurality of rows 44-1-44-2 (generally, rows 44), each row 44 corresponding to a quantum application that is scheduled to be executed at a future point in time. The rows 44 include an application identifier field 46-1 that contains the application ID of the quantum application to be executed at the future point in time, a time field 46-2 that identifies the time in the future that the quantum application is to be executed, and a qubit quantity field 46-3 that identifies the number of qubits 18 that the quantum application will utilize. In this example, the row 44-1 indicates that a quantum application A_C is scheduled to be executed at 13:00 hours and will require two qubits 18, and the row 44-2 indicates that a quantum application A_D is scheduled to be executed at 13:00 hours and will also require two qubits 18.

The quantum computing system 12-1 includes a qubit reservation service 48-1 that operates to, upon request, reserve one or more qubits 18 for a quantum application to be executed at a time in the future. While for purposes of illustration the qubit reservation service 48-1 is illustrated as a single component, in practice the functionality described herein with regard to the qubit reservation service 48-1 may be provided by a number of components executing on the quantum computing system 12-1. In some implementations, the qubit reservation service 48-1 may execute on a classical computing device and interact with the components discussed herein via inter-process communication mechanisms, such as application programming interfaces (APIs), or the like. The qubit reservation service 48-1 includes an API 50 via which other computing devices, either quantum computing systems or classical computing devices, can interact with the qubit reservation service 48-1 to reserve one or more qubits 18.

The environment 10 includes a plurality of classical computing devices 52-1-52-N (generally, computing devices 52), each of which may communicate with the qubit reservation service 48-1 via the API 50 to reserve one or more qubits 18 for execution of a quantum application that the computing devices 52 may subsequently submit to the quantum computing system 12-1 for execution. In this example, the computing device 52-1 may request that the quantum computing system 12-1 initiate a quantum application 53 implemented via a QASM file 54, and the computing device 52-N may request that the quantum computing system 12-1 initiate a quantum application 55 implemented via a QASM file 56.

An example of qubit reservation will now be presented. Assume that a user 58 desires to submit the quantum application 53 to the quantum computing system 12-1 for execution. The quantum application 53 will require one qubit for execution. The computing device 52-1 interacts with the API 50 to submit a request to reserve a qubit 18 to the qubit reservation service 48-1. The request includes an application identifier (ID) that identifies the quantum application 53. The application ID may comprise, for example, a name and location of the QASM file 54. The request may include the number of qubits 18 to be reserved, in this example one, may include the QASM file 54, or may include information that identifies a location of the QASM file 54.

The qubit reservation service 48-1 receives the request and determines that the request constitutes a request to reserve one qubit. The qubit reservation service 48-1 may make this determination because the request may include explicit information that indicates one qubit is to be reserved. Alternatively, the qubit reservation service 48-1 may access the QASM file 54 and parse the QASM file 54 to determine how many qubits 18 are to be utilized by the quantum application during execution.

Figure 1B:
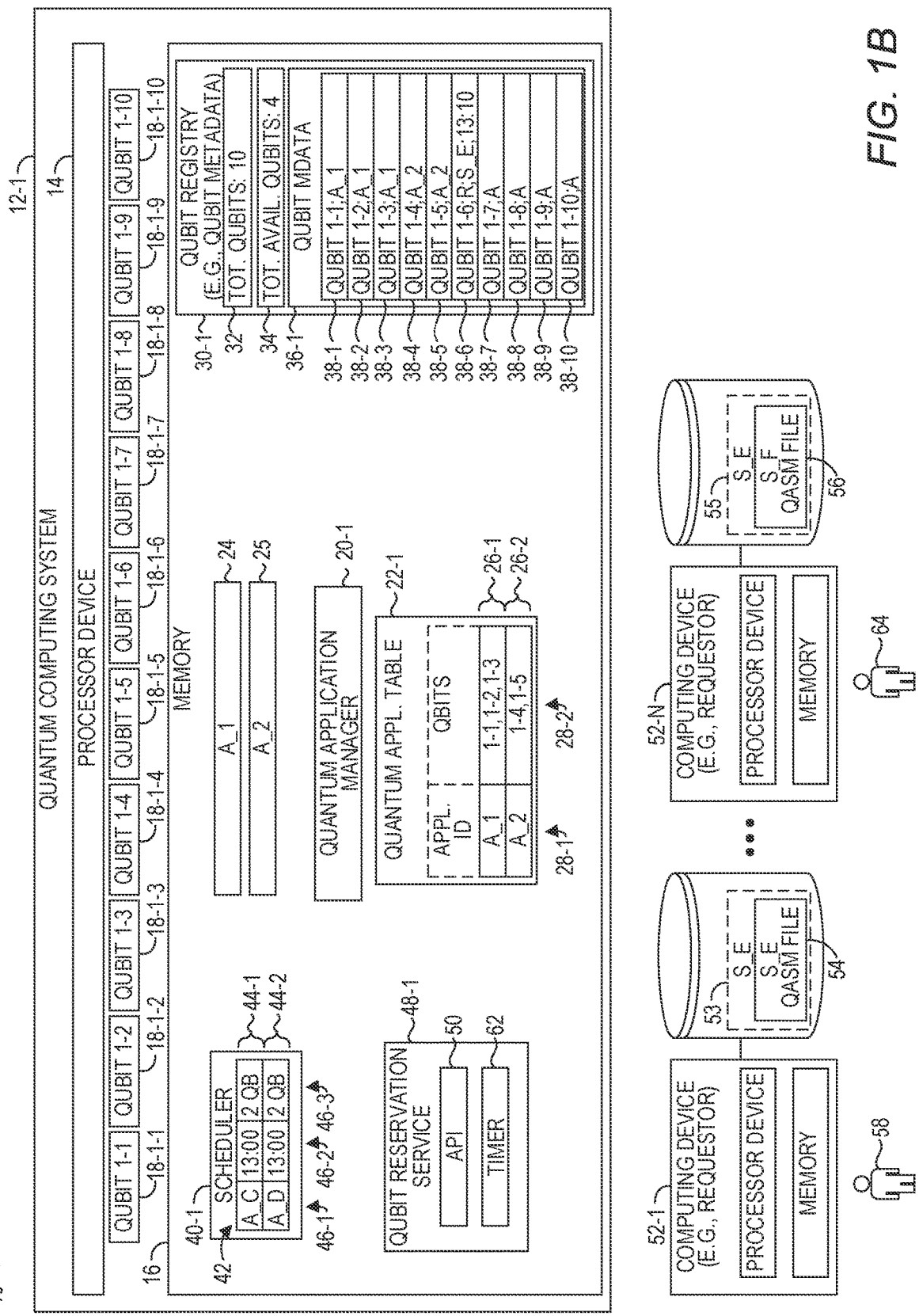

The qubit reservation service 48-1 accesses the qubit registry 30-1 and, based on the metadata record 38-6, determines that the qubit 18-1-6 is available to be reserved. Referring now to FIG. 1B, the qubit reservation service 48-1 modifies the metadata record 38-6 of the qubit registry 30-1 to reserve the qubit 18-1-6 to thereby inhibit access to the qubit 18-1-6 by any quantum application other than the quantum application 53. The qubit reservation service 48-1 may also decrement the total available qubits counter 34 by a value of 1 to indicate that fewer qubits 18 are now available on the quantum computing system 12-1.

The request to reserve the qubit 18 may include a reservation period such as 10 minutes, 20 minutes, 30 minutes, or the like that identifies a time frame within which the quantum application 53 will utilize the qubit. In other examples, the qubit reservation service 48-1 may utilize a predetermined period of time, such as, in this example, 15 minutes, to set the reservation period. In some implementations, the reservation may be infinite, and in other implementations, the reservation may be limited to a maximum predetermined period of time.

In this example, assume that the time of the request was 12:55 and that the reservation period is for 15 minutes. The qubit reservation service 48-1 modifies the metadata record 38-6 to reserve the qubit 18-1-6 for the quantum application 53 for 15 minutes. The qubit reservation service 48-1 may also set a timer 62 for 15 minutes. When the timer 62 expires, the qubit reservation service 48-1 may access the metadata record 38-6 and/or query the quantum application manager 20-1 to determine whether the quantum application 53 has begun initiating on the quantum computing system 12-1. If not, the qubit reservation service 48-1 determines that the quantum application 53 has not begun utilizing the qubit 18-1-6 within the reserved period of time, in this example 15 minutes, and the qubit reservation service 48-1 may modify the metadata record 38-6 to unreserve the qubit 18-1-6 and allow access to the qubit 18-1-6 by other quantum applications. The qubit reservation service 48-1 increments the total available qubits counter 34 by a value of one.

Upon receipt of the request by the qubit reservation service 48, and prior to reserving the qubit 18-1-6, the qubit reservation service 48-1 may access the quantum schedule 42, directly or via the scheduler 40-1, to identify any quantum applications that are scheduled to be executed in the future, the time in the future of any such executions, and the number of qubits 18 that will be utilized by any such executions. In this example, the qubit reservation service 48-1 determines that two quantum applications, A_C and A_D, are to be executed in the future, in particular at 13:00, and thus will be executed during the reservation period. Based on the quantum schedule 42, the qubit reservation service 48-1 determines that the two quantum applications will utilize a total of four qubits 18. The qubit reservation service 48-1 accesses the total available qubits counter 34 and determines that five qubits are currently available. The qubit reservation service 48-1 determines that the number of available qubits 18 remaining after reservation of the qubit 18-1-6 will be equal to or greater than the number of qubits 18 to be utilized by the two quantum applications scheduled to be executed at 13:00 and, thus, that reserving the qubit 18-1-6 will not impact the two quantum applications. Accordingly, the qubit reservation service 48-1 reserves the qubit 18-1-6 for subsequent utilization by the quantum application 53.

Assume that at 13:00 a user 64 desires to submit the quantum application 55 to the quantum computing system 12-1 for execution. The quantum application 55 will require one qubit for execution. The computing device 52-N interacts with the API 50 to submit a request to reserve a qubit 18 to the qubit reservation service 48-1. The request includes an application identifier (ID) that identifies the quantum application 55. The application ID may comprise, for example, a name and location of the QASM file 56. The request may include the number of qubits 18 to be reserved, in this example one, may include the QASM file 56, or may include information that identifies a location of the QASM file 56. In this example, the request includes a reservation time period of 20 minutes.

The qubit reservation service 48-1 receives the request and determines that the request constitutes a request to reserve one qubit 18. The qubit reservation service 48-1 may make this determination because the request may include explicit information that indicates that one qubit 18 is to be reserved. Alternatively, the qubit reservation service 48-1 may access the QASM file 56 and parse the QASM file 56 to determine how many qubits 18 are utilized by the quantum application 55 during execution.

The qubit reservation service 48-1 accesses the quantum schedule 42, directly or via the scheduler 40-1, and determines that the two quantum applications, A_C and A_D, are to be executed in ten minutes, in particular at 13:00, and thus will be executed during the reservation period of 20 minutes. Based on the quantum schedule 42, the qubit reservation service 48-1 determines that the two quantum applications will utilize a total of four qubits 18. The qubit reservation service 48-1 accesses the total available qubits counter 34 and determines that four qubits 18 are currently available. The qubit reservation service 48-1 determines that, because the two quantum applications will require four qubits 18, and because only four qubits 18 are available, no qubits 18 can currently be reserved for the quantum application 55, and the qubit reservation service 48-1 rejects the request.

Figure 1C:
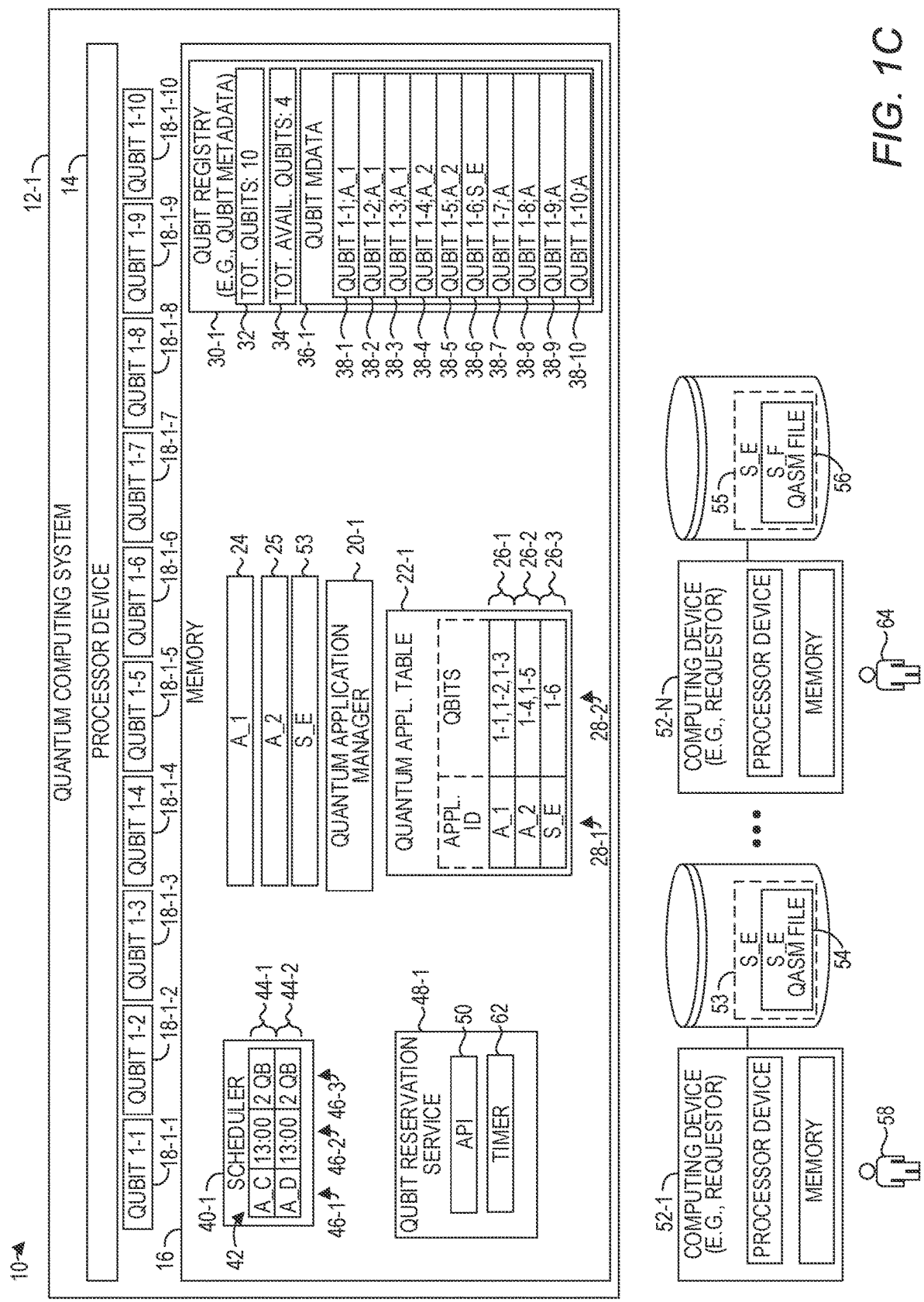

Referring now to FIG. 1C, at a point in time prior to 13:10, the computing device 52-1 submits the quantum application 53 to the quantum computing system 12-1 for execution. The quantum application manager 20-1 accesses the QASM file 54 and initiates the quantum application 53 in the memory 16 of the quantum computing system 12-1. The quantum application manager 20-1, or the qubit reservation service 48-1, modifies the metadata record 38-6 to indicate that the qubit 18-1-6 is in use by the quantum application 53. The quantum application manager 20-1 adds a row 26-3 to the quantum application table 22-1 that corresponds to the quantum application 53.

Figure 1D:
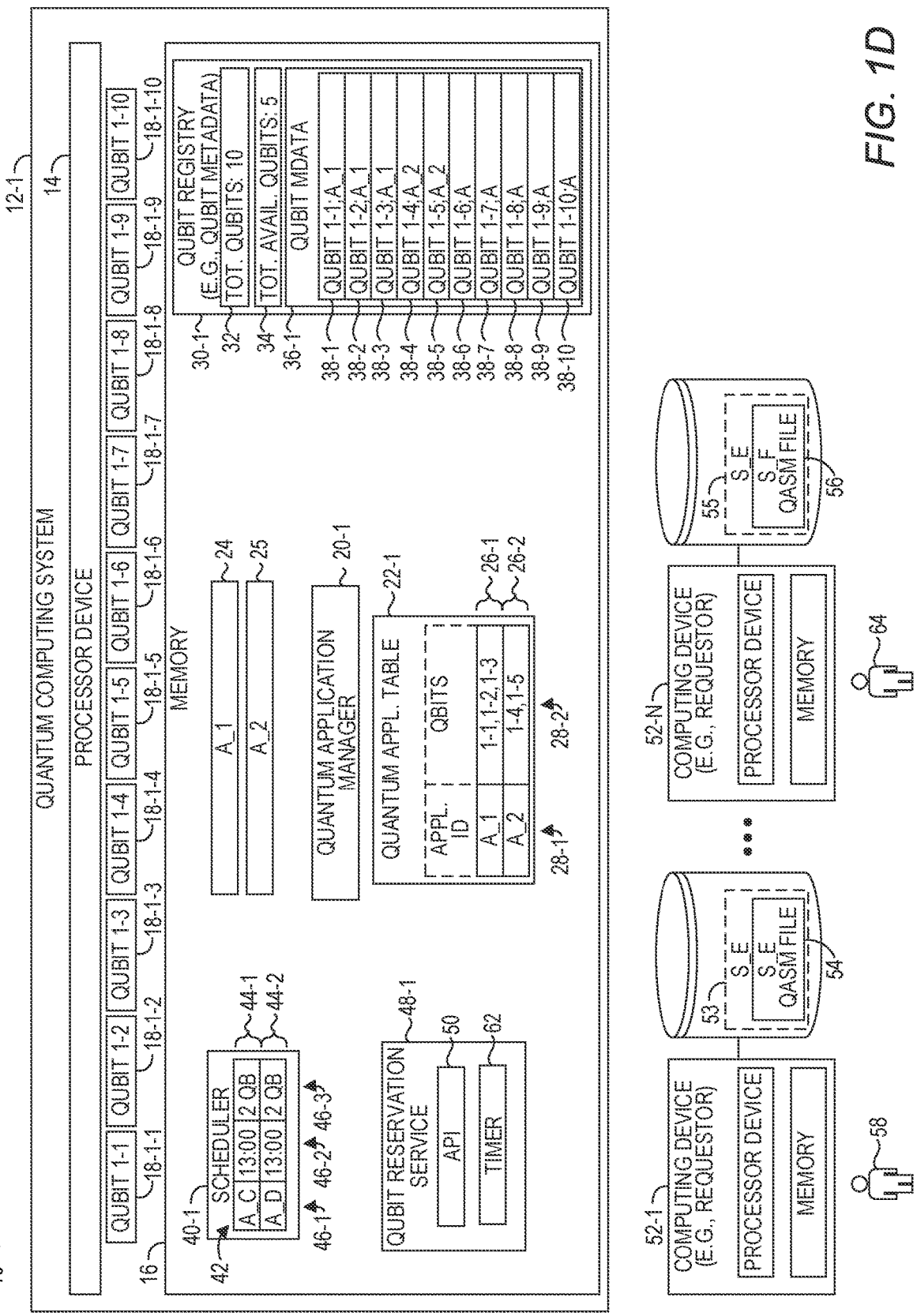

Referring now to FIG. 1D, the quantum application 53 executes for several minutes and then terminates. The quantum application manager 20-1, or the qubit reservation service 48, modifies the metadata record 38-6 to indicate that the qubit 18-1-6 is available for use, and updates the total available qubit counter 34 to indicate that five qubits 18 are now available. The quantum application manager 20-1 removes the row 26-3 (FIG. 1C) from the quantum application table 22-1.

It is noted that because the qubit reservation service 48-1 is a component of the quantum computing system 12-1, functionality implemented by the qubit reservation service 48-1 may be attributed to the quantum computing system 12-1 generally. Moreover, in examples where the qubit reservation service 48-1 comprises software instructions that program the processor device 14 to carry out functionality discussed herein, functionality implemented by the qubit reservation service 48-1 may be attributed herein to the processor device 14.

Figure 2:
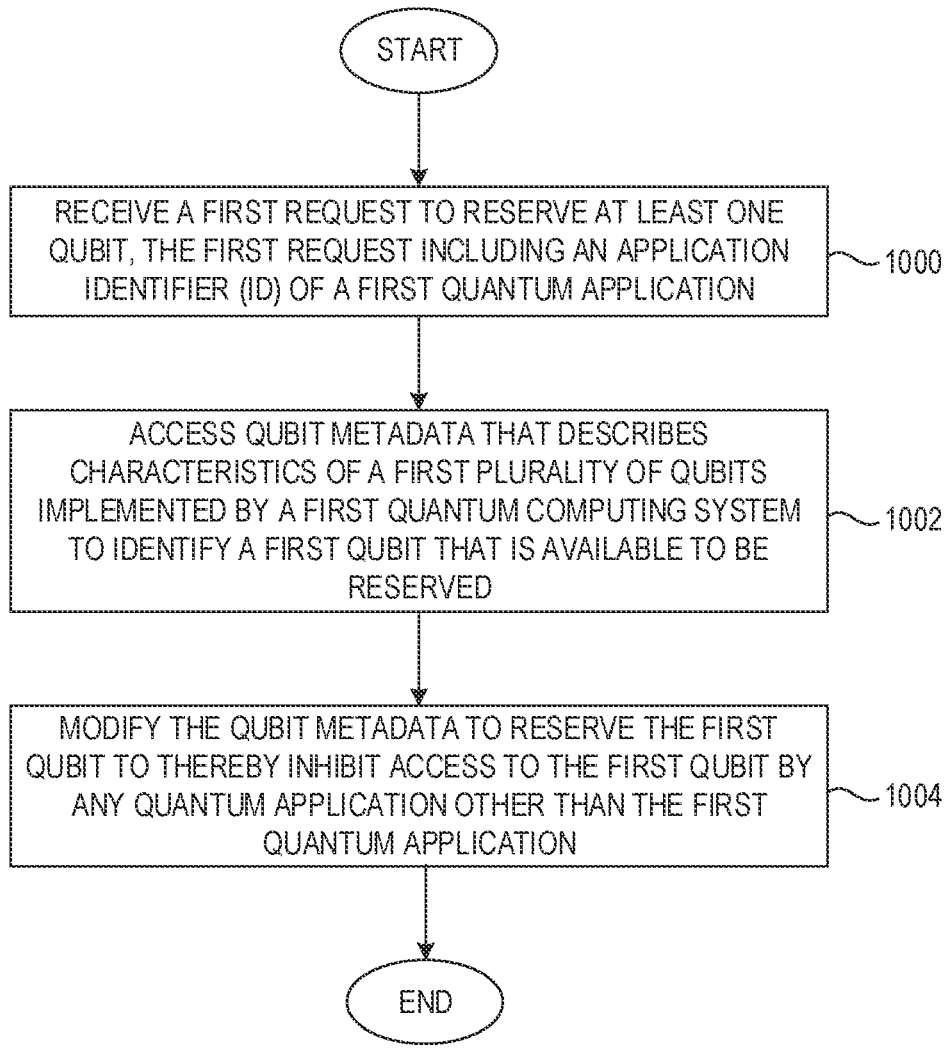
FIG. 2 is a flowchart of a method for qubit reservation according to one implementation.

FIG. 2 is a flowchart of a method for qubit reservation according to one implementation. FIG. 2 will be discussed in conjunction with FIGS. 1A-1D. The quantum computing system 12-1 receives, from a requestor, such as the classical computing device 52-1, a first request to reserve at least one qubit 18, the first request including an application identifier (ID) of the quantum application 53 (FIG. 2, block 1000). The quantum computing system 12-1 accesses qubit metadata, such as the qubit registry 30-1, that describes characteristics of the plurality of qubits 18 implemented by the quantum computing system 12-1 to identify the qubit 18-1-6 that is available to be reserved (FIG. 2, block 1002). The quantum computing system 12-1 modifies the qubit metadata to reserve the qubit 18-1-6 to thereby inhibit access to the qubit 18-1-6 by any quantum application other than the quantum application 53 (FIG. 2, block 1004).

Figure 3A:
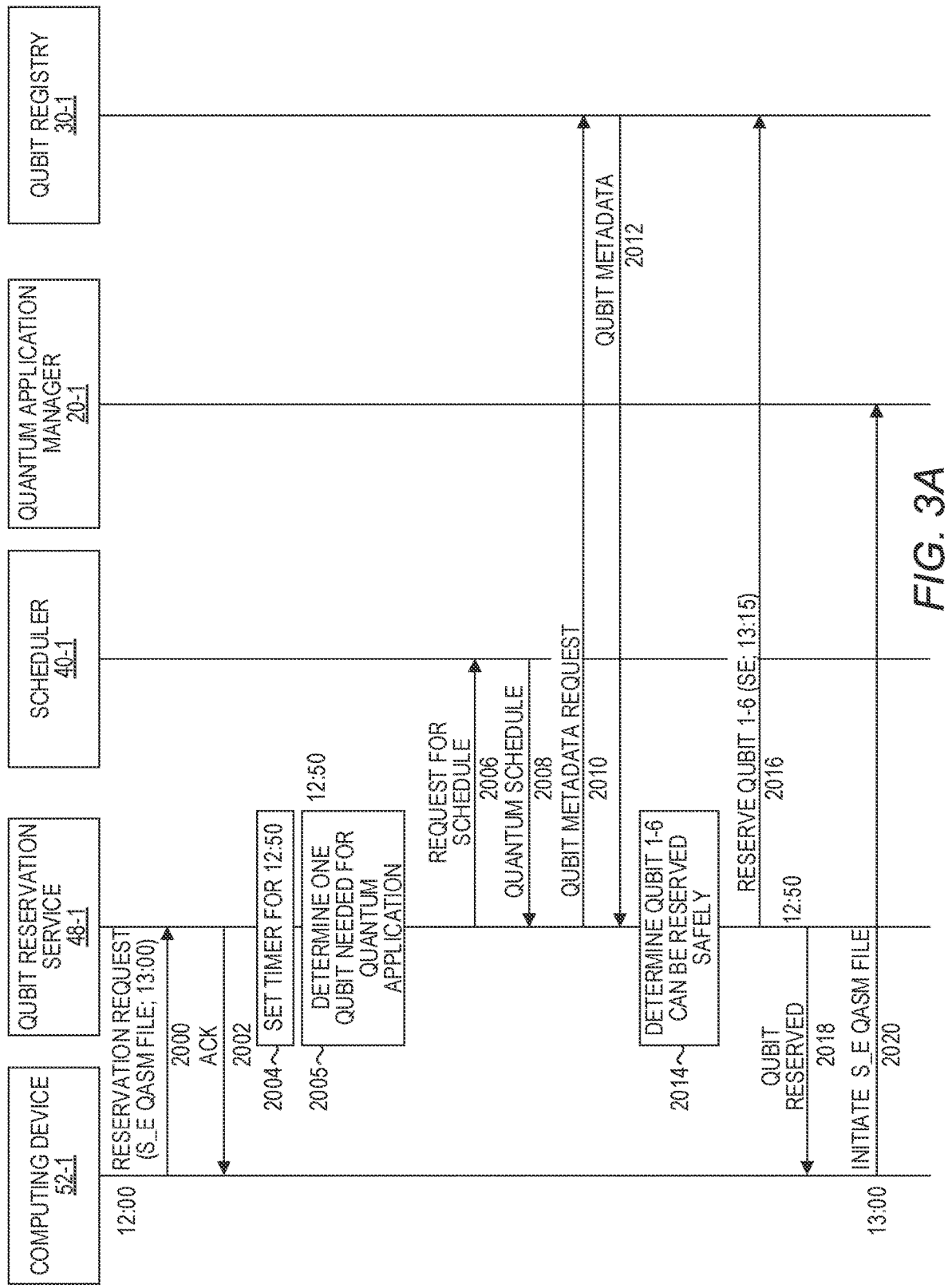
FIGS. 3A-3B illustrate a sequence diagram of messages communicated between and actions taken by various components illustrated in FIG. 1A according to another implementation.
Figure 3B:
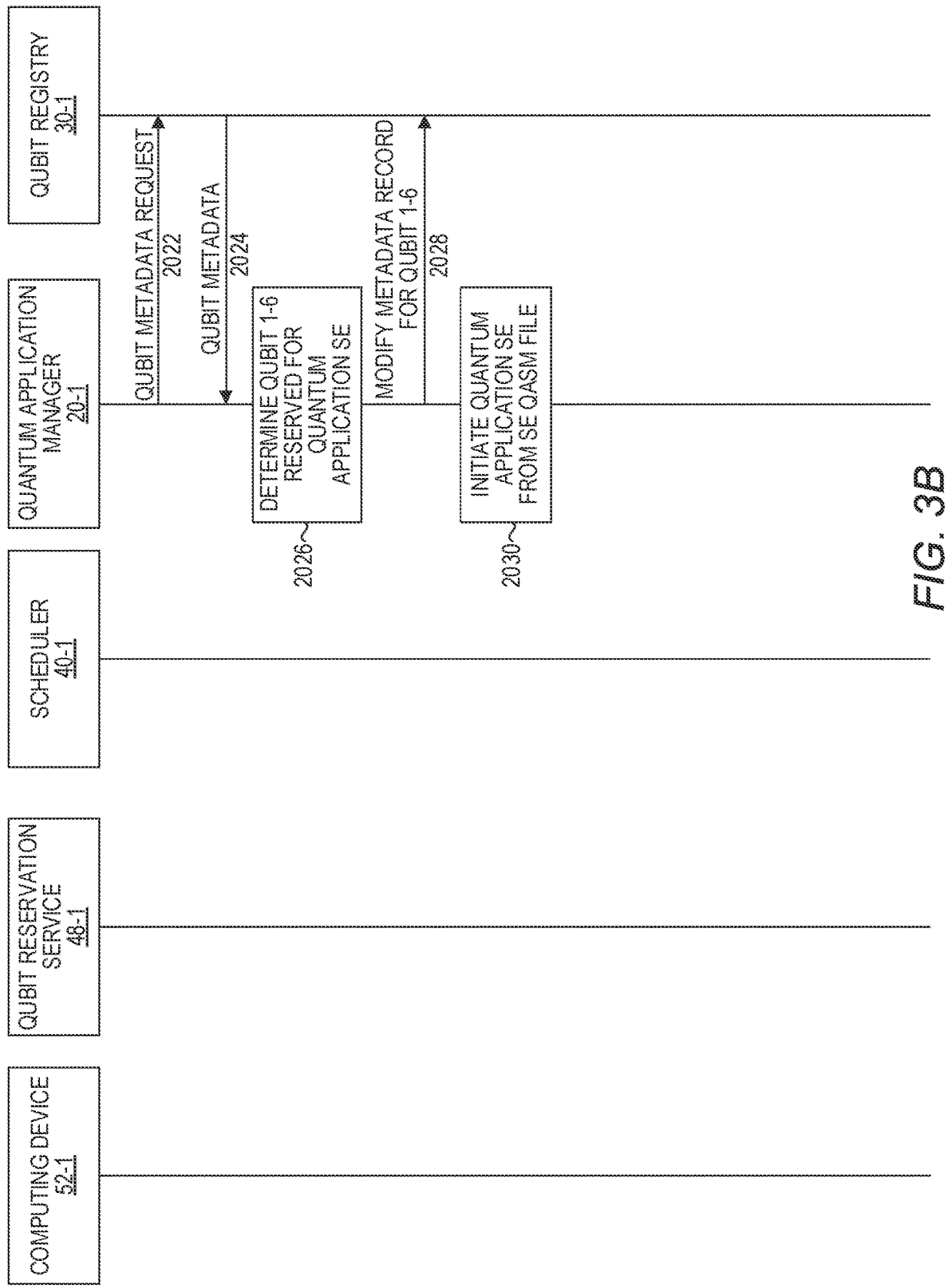

FIGS. 3A-3B illustrate a sequence diagram of messages communicated between and actions taken by various components illustrated in FIG. 1A according to another implementation. In this example, at 12:00 the computing device 52-1 sends a reservation request to the qubit reservation service 48-1 that includes an application ID of the quantum application 53 in the form of the name and location of the QASM file 54, and a future time, in this example 13:00, at which the quantum application 53 will utilize the qubit 18 (FIG. 3A, block 2000). The qubit reservation service 48-1 sends an acknowledgement message to the computing device 52-1 to acknowledge receipt of the request (FIG. 3A, block 2002). The qubit reservation service 48-1 sets the timer 62 for a predetermined period of time prior to the requested future time (FIG. 3A, block 2004). In this example, the predetermined period of time is 10 minutes, and the qubit reservation service 48-1 sets the timer 62 for 12:50, 10 minutes prior to the requested time of 13:00.

At 12:50, the timer 62 expires, and the qubit reservation service 48-1 accesses the QASM file 54 and determines that the quantum application 53, during execution, will utilize a single qubit 18 (FIG. 3A, block 2005). The qubit reservation service 48-1 sends a request for the quantum schedule 42 to the scheduler 40-1 (FIG. 3A, block 2006). The scheduler 40-1 sends the quantum schedule 42 to the qubit reservation service 48-1 (FIG. 3A, block 2008). Based on the quantum schedule 42, the qubit reservation service 48-1 determines that two quantum applications, A_C and A_D, are to be executed at 13:00 and, thus, will be executed substantially concurrently with the quantum application 53 based on the reservation received from computing device 52-1. The qubit reservation service 48-1 determines that the two quantum applications will utilize a total of four qubits 18. The qubit reservation service 48-1 sends a qubit metadata request to the qubit registry 30-1 (FIG. 3A, block 2010). The qubit registry 30-1 sends the qubit metadata to the qubit reservation service 48-1 (FIG. 3A, block 2012).

The qubit reservation service 48-1 accesses the total available qubits counter 34 and determines that five qubits 18 are currently available. The qubit reservation service 48-1 determines that the qubit 18-1-6 is currently available for reservation. The qubit reservation service 48-1 also determines that the number of available qubits 18 remaining after reservation of the qubit 18-1-6 will be equal to or greater than the number of qubits 18 to be utilized by the two quantum applications scheduled to be executed at 13:00, and thus that reserving the qubit 18-1-6 will not impact the two quantum applications (FIG. 3A, block 2014). Accordingly, the qubit reservation service 48-1 sends a message to the qubit registry 30-1 to reserve the qubit 18-1-6 for subsequent utilization by the quantum application 53 (FIG. 3A, block 2016). The qubit reservation service 48-1 sends a confirmation message to the computing device 52-1 that a qubit 18 has been reserved (FIG. 3A, block 2018).

At 13:00, the computing device 52-1 sends a message to the quantum application manager 20-1 that includes a location of the QASM file 54 to initiate the quantum application 53 (FIG. 3A, block 2020). Referring now to FIG. 3B, the quantum application manager 20-1 sends a request to the qubit registry 30-1 for the qubit metadata (FIG. 3B, block 2022). The qubit registry 30-1 sends the qubit metadata to the quantum application manager 20-1 (FIG. 3B, block 2024). The quantum application manager 20-1 determines that the qubit 18-1-6 has been reserved for the quantum application 53 (FIG. 3B, block 2026). The quantum application manager 20-1 sends a message to the qubit registry 30-1 to modify the qubit metadata to indicate that the qubit 18-1-6 is being utilized by the quantum application 53 (FIG. 3B, block 2028). The quantum application manager 20-1 initiates the quantum application 53 from the QASM file 54 (FIG. 3B, block 2030).

Figure 4A:
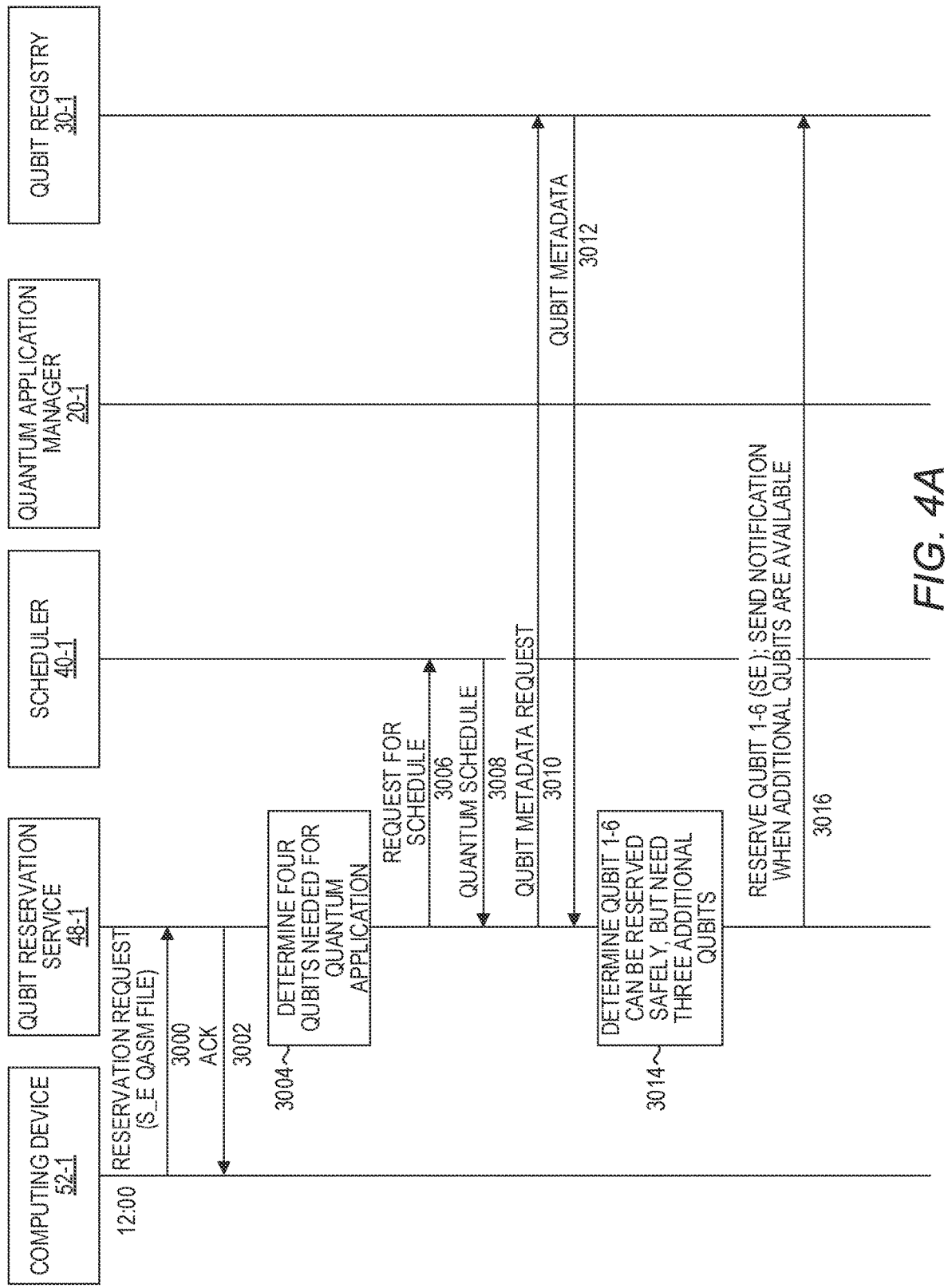
FIGS. 4A-4B illustrate a sequence diagram of messages communicated between and actions taken by various components illustrated in FIG. 1A according to another implementation.
Figure 4B:
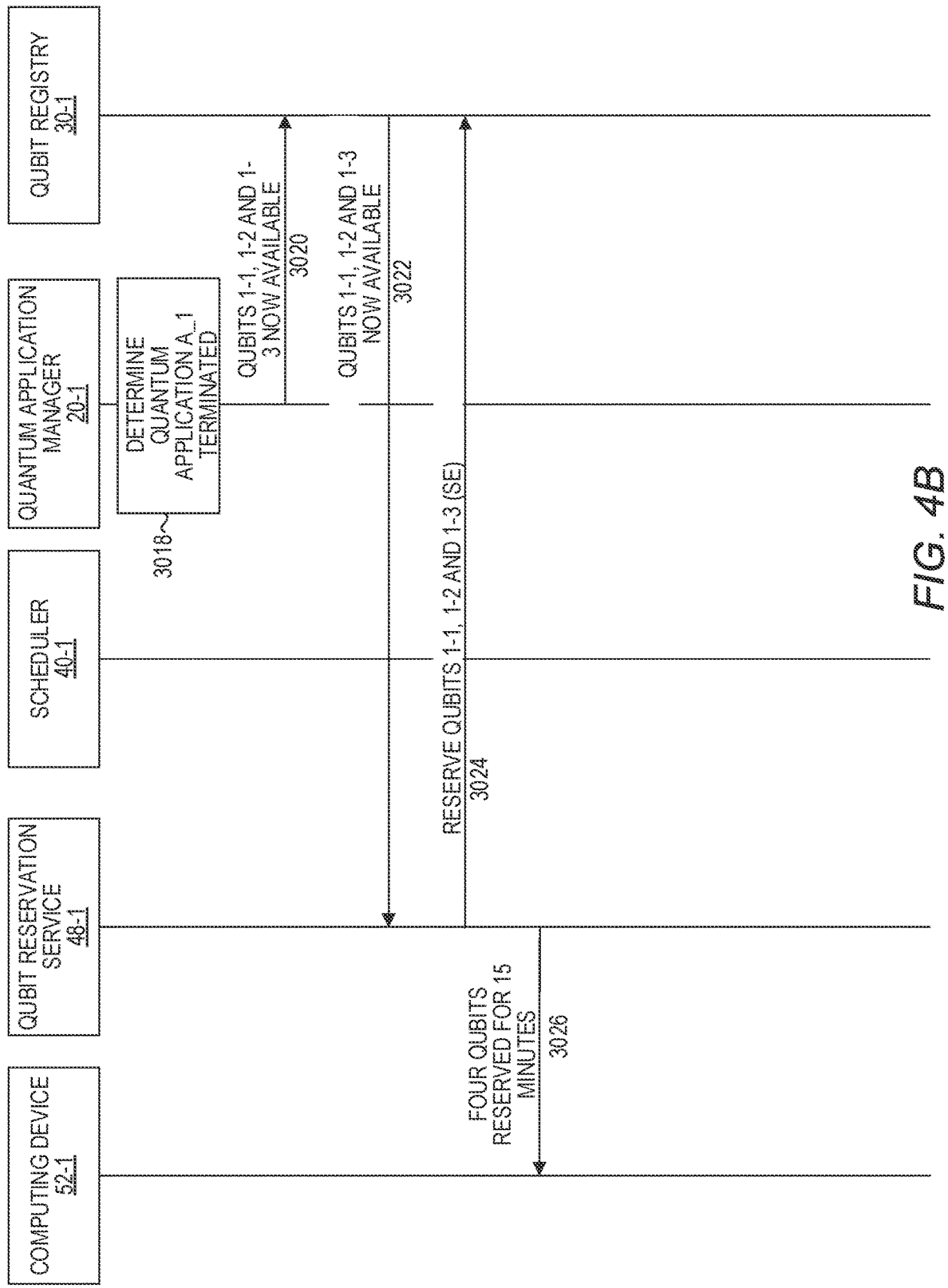

FIGS. 4A-4B illustrate a sequence diagram of messages communicated between and actions taken by various components illustrated in FIG. 1A according to another implementation. In this example, assume that the quantum application 53 utilizes four qubits 18. The computing device 52-1 sends a reservation request to the qubit reservation service 48-1 that includes an application ID of the quantum application 53 in the form of the name and location of the QASM file 54 (FIG. 4A, block 3000). The qubit reservation service 48-1 sends an acknowledgement message to the computing device 52-1 to acknowledge receipt of the request (FIG. 4A, block 3002). The qubit reservation service 48-1 accesses the QASM file 54 and determines that the quantum application 53, during execution, will utilize four qubits 18 (FIG. 4A, block 3004). The qubit reservation service 48-1 sends a request for the quantum schedule 42 to the scheduler 40-1 (FIG. 4A, block 3006). The scheduler 40-1 sends the quantum schedule 42 to the qubit reservation service 48-1 (FIG. 4A, block 3008). In this example, assume that the two quantum applications, A_C and A_D have already begun execution and that the quantum schedule 42 indicates that no other quantum applications are scheduled to be executed. The qubit reservation service 48-1 sends a qubit metadata request to the qubit registry 30-1 (FIG. 4A, block 3010). The qubit registry 30-1 sends the qubit metadata to the qubit reservation service 48-1 (FIG. 4A, block 3012).

The qubit reservation service 48-1 accesses the total available qubits counter 34 and determines that one qubit 18 is currently available (FIG. 4A, block 3014). The qubit reservation service 48-1 sends a message to the qubit registry 30-1 to reserve the qubit 18-1-6 for subsequent utilization by the quantum application 53, and requests notification when additional qubits become available (FIG. 4A, block 3016). At a subsequent point in time, the quantum application 24 terminates. The quantum application manager 20-1 detects the termination of the quantum application 24 and sends a message to the qubit registry 30-1 indicating that the qubits 18-1-1, 18-1-2, and 18-1-3 are now available (FIG. 4B, blocks 3018, 3020). The qubit reservation service 48-1 modifies the qubit metadata to indicate that the qubits 18-1-1, 18-1-2, and 18-1-3 are now available, and sends a notification to the qubit reservation service 48-1 that the qubits 18-1-1, 18-1-2, and 18-1-3 are available (FIG. 4B, block 3022). The qubit reservation service 48-1 sends a message to the qubit registry 30-1 to reserve the qubits 18-1-1, 18-1-2, and 18-1-3 for subsequent utilization by the quantum application 53 (FIG. 4B, block 3024). The qubit reservation service 48-1 sends a message to the computing device 52-1 that indicates that qubits 18 have been reserved for the quantum application 53 for a designated period of time, in this example, 15 minutes.

Figure 5A:
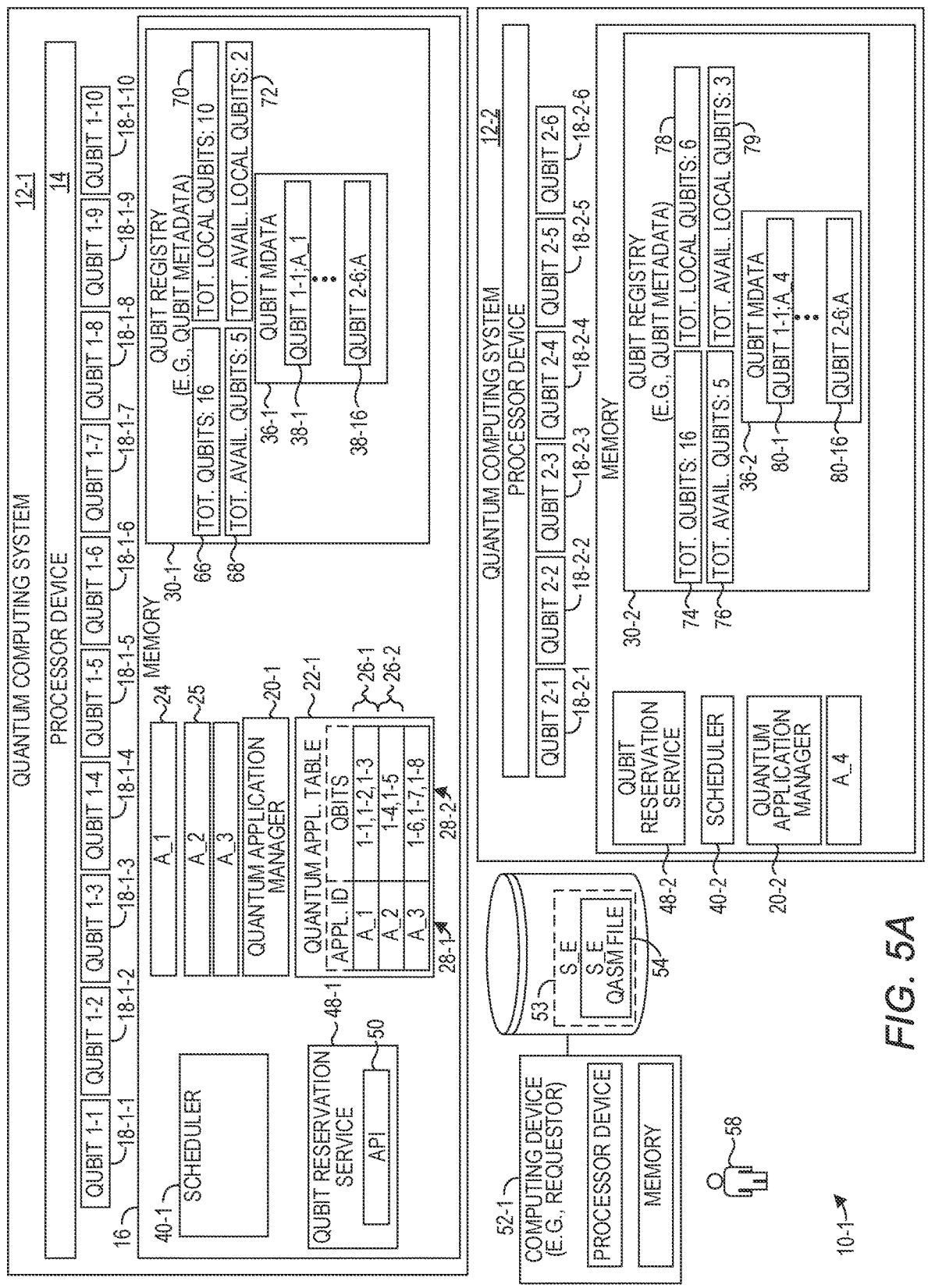
FIGS. 5A-5B are block diagrams of a distributed quantum computing environment according to one implementation.
Figure 5B:
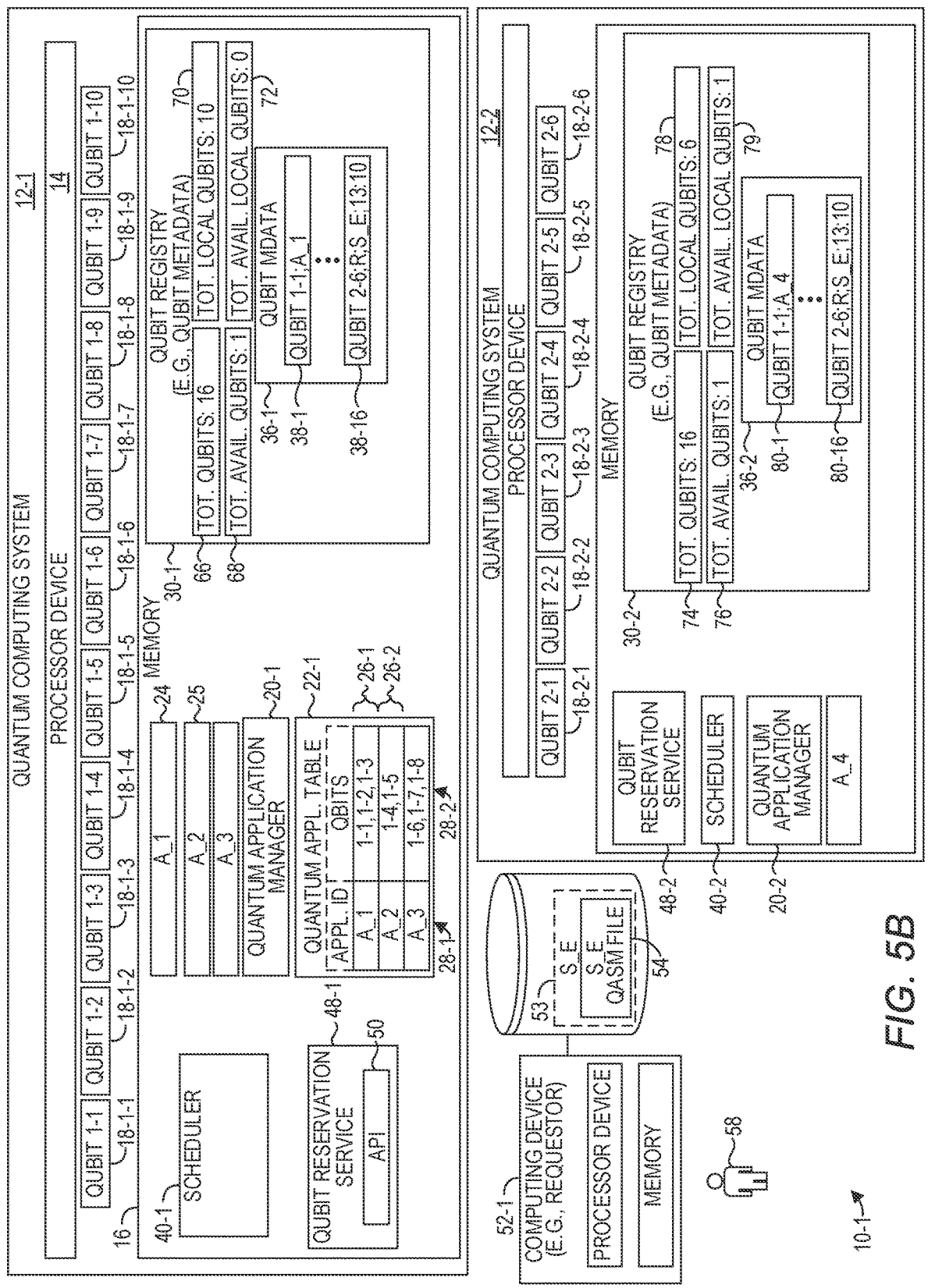

FIGS. 5A-5B are block diagrams of a distributed quantum computing environment 10-1 according to one implementation. The environment 10-1 includes the quantum computing system 12-1 and a quantum computing system 12-2. While for reasons of space only two quantum computing systems 12 are illustrated, in practice, the environment 10-1 may include any number of quantum computing systems 12. The quantum computing systems 12-1 and 12-2 communicate with each other to maintain a pool of qubits 18 that may be utilized by quantum applications executing on either of the quantum computing systems 12-1 and 12-2. When the qubit metadata changes on a quantum computing system 12-1 or 12-2, the quantum computing system 12 on which the change occurred sends qubit update records to the other quantum computing system 12 to ensure the qubit registeries are synchronized.

The quantum computing system 12-2 implements six qubits 18-2-1-18-2-6. The quantum computing system 12-2 includes a qubit reservation service 48-2 that operates substantially similarly to the qubit reservation service 48-1 described above, a scheduler 40-2 that operates substantially similarly to the scheduler 40-1 described above, and a quantum application manager 20-2 that operates substantially similarly to the quantum application manager 20-1 described above.

The quantum computing system 12-1 includes a total qubits counter 66 that identifies the total number of qubits 18 implemented by both the quantum computing systems 12-1 and 12-2, in this example, sixteen qubits. The quantum computing system 12-1 includes a total available qubits counter 68 that maintains track of the current number of available qubits 18 (e.g., qubits 18 that are available for use or reservation) on both the quantum computing systems 12-1 and 12-2. At the point in time illustrated in FIG. 5A, there are five available qubits 18. A total local qubits counter 70 identifies the total number of qubits 18 implemented by only the quantum computing system 12-1, in this example ten. A total available local qubits counter 72 identifies the total number of qubits 18 that are available on the quantum computing system 12-1, at this point in time, two.

The quantum computing system 12-2 includes a qubit registry 30-2 that maintains a total qubits counter 74 that identifies the total number of qubits implemented by both the quantum computing systems 12-1 and 12-2, in this example, sixteen qubits. The quantum computing system 12-2 includes a total available qubits counter 76 that maintains track of the current number of available qubits 18 (e.g., qubits 18 that are available for use or reservation) on both the quantum computing systems 12-1 and 12-2. At the point in time illustrated in FIG. 5A, there are five available qubits. A total local qubits counter 78 identifies the total number of qubits 18 implemented by only the quantum computing system 12-2, in this example six. A total available local qubits counter 79 identifies the total number of qubits 18 that are available on the quantum computing system 12-2, at this point in time, three. The qubit registry 30-2 also maintains qubit metadata 36-2, which comprises a plurality of metadata records 80-1-80-16 (generally, metadata records 80), each of which maintains information about a corresponding qubit 18-1-1-18-2-6.

Assume in this example that the quantum application 53 utilizes four qubits 18 rather than one. The user 58 desires to submit the quantum application 53 to the quantum computing system 12-1 for execution. The computing device 52-1 interacts with the API 50 to submit a request to reserve four qubits 18 to the qubit reservation service 48-1. The request includes an application identifier (ID) that identifies the quantum application 53. The application ID may comprise, for example, a name and location of the QASM file 54. The request may include the number of qubits 18 to be reserved, in this example four, may include the QASM file 54, or may include information that identifies a location of the QASM file 54.

The qubit reservation service 48-1 receives the request and determines that the request constitutes a request to reserve four qubits 18. The qubit reservation service 48-1 may make this determination because the request may include explicit information that indicates four qubits 18 are to be reserved. Alternatively, the qubit reservation service 48-1 may access the QASM file 54 and parse the QASM file 54 to determine how many qubits 18 are utilized by the quantum application 53 during execution.

The qubit reservation service 48-1 accesses the qubit registry 30-1 and, based on the total available local qubits counter 72 and the total available qubits counter 68, determines that only two qubits 18 are currently available for allocation on the quantum computing system 12-1, but that three qubits 18 are available on the quantum computing system 12-2. Based on the qubit metadata records 38-1-38-16, which correspond to the qubits 18-1-1-18-2-6, assume that the qubit reservation service 48-1 determines that the qubits 18-1-9, 18-1-10, 18-2-4, 18-2-5, and 18-2-6 are available. The qubit reservation service 48-1 accesses the scheduler 40-1 and determines that no quantum applications are currently scheduled for execution on the quantum computing system 12-1. The qubit reservation service 48-1 may send a query to the scheduler 40-2 on the quantum computing system 12-2 to determine whether any quantum applications are currently scheduled for execution on the quantum computing system 12-2. In this example, no quantum applications are currently scheduled for execution on the quantum computing system 12-2.

Referring now to FIG. 5B, the qubit reservation service 48-1 modifies the qubit registry 30-1 to reserve the four qubits 18-1-9, 18-1-10, 18-2-5, and 18-2-6 to thereby inhibit access to the qubits 18-1-9, 18-1-10, 18-2-5, and 18-2-6 by any quantum application other than the quantum application 53. The qubit reservation service 48-1 decrements the total available qubits counter 68 by a value of four, and decrements the total available local qubits counter 72 by a value of two.

The qubit reservation service 48-1 sends, to the quantum computing system 12-2, information indicating that the qubits 18-1-9, 18-1-10, 18-2-5, and 18-2-6 are reserved to thereby inhibit access to the qubits 18-1-9, 18-1-10, 18-2-5, and 18-2-6 by any quantum application other than the quantum application 53 for a period of time. The qubit reservation service 48-2 receives the information from the quantum computing system 12-1 indicating that the qubits 18-1-9, 18-1-10, 18-2-5, and 18-2-6 are reserved for the quantum application 53 to be executed on the quantum computing system 12-1. The qubit reservation service 48-2 updates the qubit registry 30-2 by modifying the metadata records 80 that correspond to the qubits 18-1-9, 18-1-10, 18-2-5, and 18-2-6 to indicate that the qubits 18-1-9, 18-1-10, 18-2-5, and 18-2-6 are reserved for the quantum application 53. The qubit reservation service 48-2 decrements the total available qubits counter 76 by a value of four, and decrements the total available local qubits counter 79 by a value of two.

Figure 6:
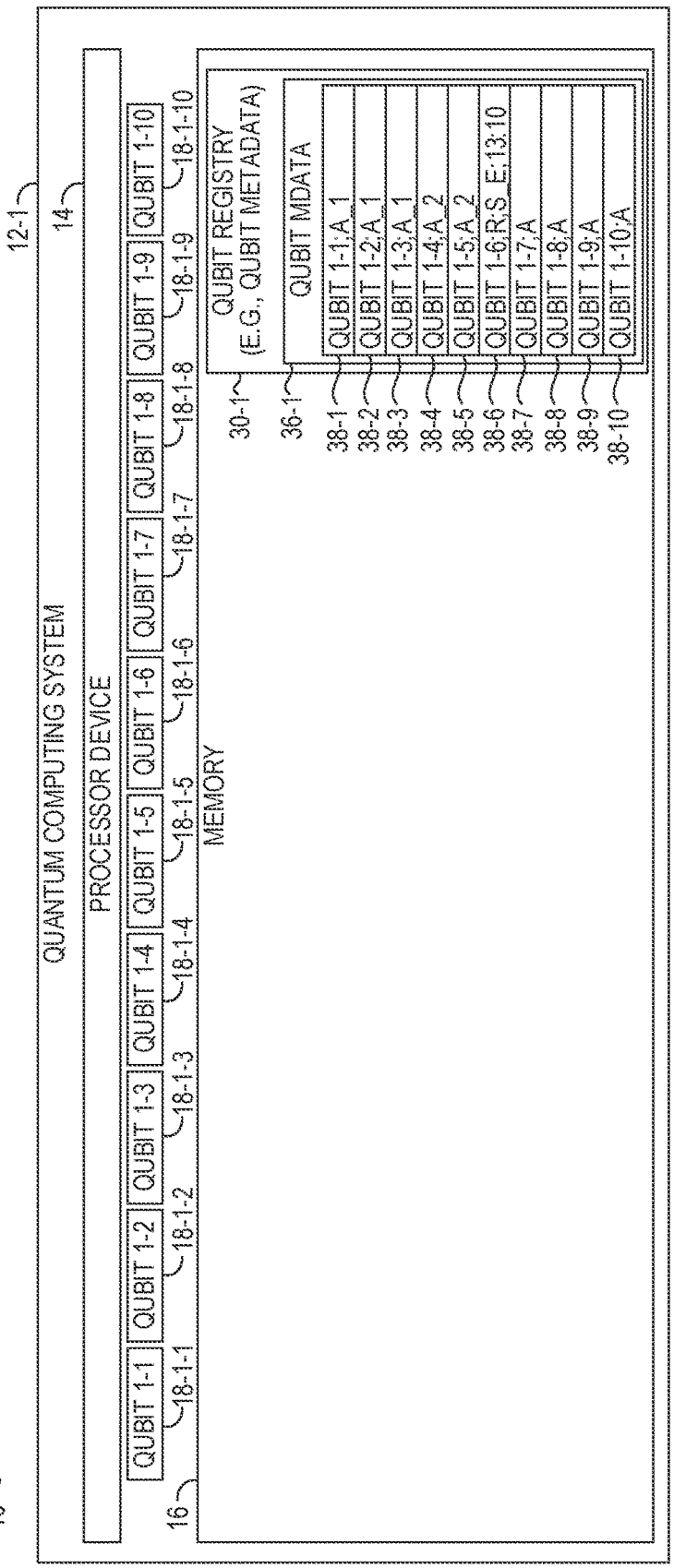
FIG. 6 is a simplified block diagram of the environment illustrated in FIGS. 1A-1D according to another implementation.
Figure 6:
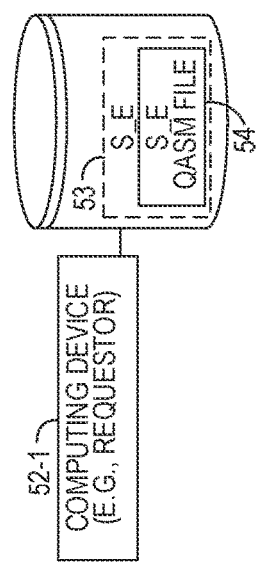

FIG. 6 is a simplified block diagram of the environment 10 illustrated in FIGS. 1A-1D according to another implementation. The environment 10 includes the memory 16 and the processor device 14 coupled to the memory 16. The processor device 14 is to receive, from a requestor such as the computing device 52-1, a request to reserve at least one qubit 18-1-1-18-1-10, the request including an application identifier (ID) of the quantum application 53. The processor device 14 is further to access the qubit registry 30-1 that describes characteristics of the plurality of qubits 18-1-1-18-1-10 implemented by the quantum computing system 12-1 to identify the qubit 18-1-6 that is available to be reserved. The processor device 14 is further to modify the qubit registry 30-1 to reserve the qubit 18-1-6 to thereby inhibit access to the qubit 18-1-6 by any quantum application other than the quantum application 53.

Figure 7:
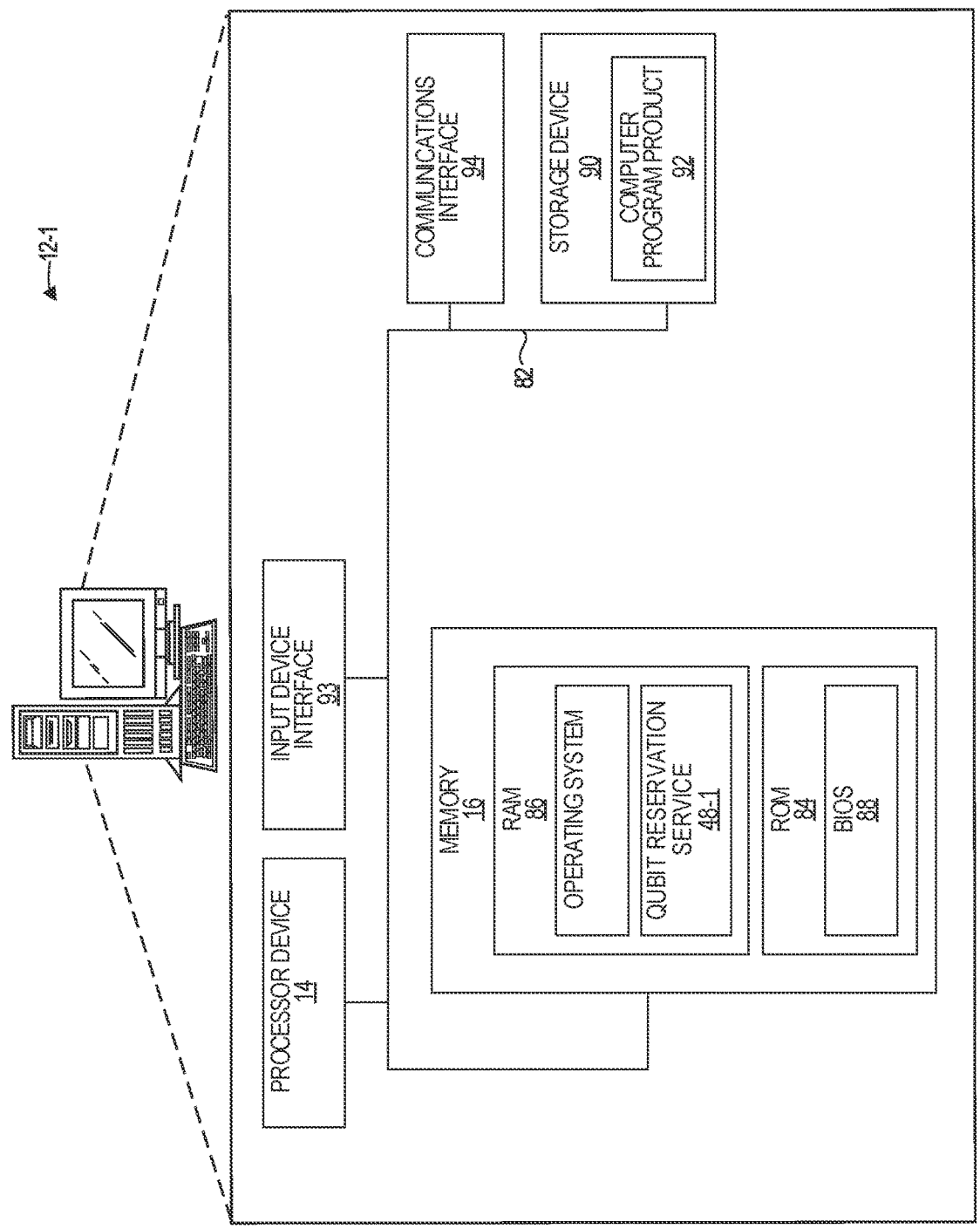
FIG. 7 is a block diagram of the quantum computing system illustrated in FIG. 1A according to one implementation.

FIG. 7 is a block diagram of the quantum computing system 12-1 according to one implementation. The quantum computing system 12-1 may comprise any computing or electronic device capable of including firmware, hardware, and/or executing software instructions to implement the functionality described herein in a quantum computing environment. The quantum computing system 12-1 includes the processor device 14, the system memory 16, and a system bus 82. The system bus 82 provides an interface for system components including, but not limited to, the system memory 16 and the processor device 14. The processor device 14 can be any commercially available or proprietary processor.

The system memory 16 may include non-volatile memory 84 (e.g., read-only memory (ROM), erasable programmable read-only memory (EPROM), electrically erasable programmable read-only memory (EEPROM), etc.), and volatile memory 86 (e.g., random-access memory (RAM)). A basic input/output system (BIOS) 88 may be stored in the non-volatile memory 84 and can include the basic routines that help to transfer information between elements within the quantum computing system 12-1. The volatile memory 86 may also include a high-speed RAM, such as static RAM, for caching data.

The quantum computing system 12-1 may further include or be coupled to a non-transitory computer-readable storage medium such as a storage device 90, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 90 and in the volatile memory 86, including an operating system and one or more program modules, such as the qubit reservation service 48-1, which may implement the functionality described herein in whole or in part. All or a portion of the examples may be implemented as a computer program product 92 stored on a transitory or non-transitory computer-usable or computer-readable storage medium, such as the storage device 90, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the qubit reservation service 48-1 in the volatile memory 86, may serve as a controller, or control system, for the quantum computing system 12-1 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 93 that is coupled to the system bus 82 but can be connected by other interfaces such as a parallel port, an Institute of Electrical and Electronic Engineers (IEEE) 1394 serial port, a Universal Serial Bus (USB) port, an IR interface, and the like. The quantum computing system 12-1 may also include a communications interface 94 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a first computing system comprising a processor device from a requestor, a first request to reserve at least one qubit, the first request including an application identifier (ID) of a first quantum application and a reservation period that designates a period of time from a time of the first request within which the first quantum application will utilize the at least one qubit;

accessing qubit metadata that describes characteristics of a first plurality of qubits implemented by a first quantum computing system to identify a first qubit that is available to be reserved;

modifying the qubit metadata to reserve the first qubit for the period of time to thereby inhibit access to the first qubit by any quantum application other than the first quantum application;

subsequent to modifying the qubit metadata to reserve the first qubit, determining, by the first computing system, that the first quantum application did not utilize the first qubit within the period of time; and modifying the qubit metadata to unreserve the first qubit and allow access to the first qubit by other quantum applications.

2. The method of claim 1 further comprising decrementing an available qubit counter that identifies an available number of the first plurality of qubits of the first quantum computing system.

3. The method of claim 1 further comprising:
prior to modifying the qubit metadata to reserve the first qubit, accessing a quantum schedule that identifies a second quantum application to be executed in the future, and that identifies a future time at which the second quantum application is to be executed;
determining a number of qubits to be utilized by the second quantum application; and
determining that a number of available qubits remaining after reservation of the first qubit will be equal to or greater than the number of qubits to be utilized by the second quantum application.

4. The method of claim 1 wherein the first request to reserve the at least one qubit comprises a request to reserve an identified quantity of qubits, and further comprising:
determining that a quantity of available qubits on the first quantum computing system is less than the identified quantity of qubits;
modifying the qubit metadata that describes the characteristics of the first plurality of qubits implemented by the first quantum computing system to reserve the first qubit of the first plurality of qubits; and
modifying qubit metadata that describes characteristics of a second plurality of qubits implemented by a second quantum computing system to reserve a second qubit of the second plurality of qubits to thereby inhibit access to the second qubit of the second plurality of qubits by any quantum application other than the first quantum application for the period of time.

5. The method of claim 4 further comprising sending, to the second quantum computing system, information indicating that the first qubit of the first plurality of qubits and the second qubit of the second plurality of qubits are reserved to thereby inhibit access to the first qubit of the first plurality of qubits the second qubit of the second plurality of qubits by any quantum application other than the first quantum application for a period of time.

6. The method of claim 1 wherein the first quantum computing system comprises the first computing system.

7. The method of claim 1 wherein the first computing system is a different computing system from the first quantum computing system.

8. The method of claim 1 further comprising:
receiving, by the first computing system, from a second quantum computing system, a qubit metadata update record indicating that a second qubit of the first plurality of qubits is to be reserved for a second quantum application to execute on the second quantum computing system; and
modifying the qubit metadata that describes characteristics of the first plurality of qubits implemented by the first quantum computing system to reserve the second qubit of the first plurality of qubits to thereby inhibit access to the second qubit by any quantum application other than the second quantum application for a period of time.

9. The method of claim 1 further comprising:
prior to modifying the qubit metadata, determining that no qubits of the first plurality of qubits are available;
subsequently determining that the first qubit is available;
modifying the qubit metadata; and
communicating information to the requestor that the first qubit has been reserved.

10. A computing device, comprising:
a memory; and
a processor device coupled to the memory to:
receive, from a requestor, a first request to reserve at least one qubit, the first request including an application identifier (ID) of a first quantum application and a reservation period that designates a period of time from a time of the first request within which the first quantum application will utilize the at least one qubit;
access qubit metadata that describes characteristics of a first plurality of qubits implemented by a first quantum computing system to identify a first qubit that is available to be reserved;
modify the qubit metadata to reserve the first qubit for the period of time to thereby inhibit access to the first qubit by any quantum application other than the first quantum application;
subsequent to modifying the qubit metadata to reserve the first qubit, determine, by the first computing system, that the first quantum application did not utilize the first qubit within the period of time; and
modify the qubit metadata to unreserve the first qubit and allow access to the first qubit by other quantum applications.

11. The computing device of claim 10 wherein the processor device is further to:
subsequent to modifying the qubit metadata to reserve the first qubit and prior to an initiation of the first quantum application, receive a second request to reserve a qubit of the first plurality of qubits, the second request including an application ID of a second quantum application;
access the qubit metadata that describes the characteristics of the first plurality of qubits;
determine that no qubits are available based on the qubit metadata that describes the characteristics of the first plurality of qubits; and
reject the second request based on determining that no qubits are available.

12. A non-transitory computer-readable storage medium that includes executable instructions to cause a processor device to:
receive, from a requestor, a first request to reserve at least one qubit, the first request including an application identifier (ID) of a first quantum application and a reservation period that designates a period of time from a time of the first request within which the first quantum application will utilize the at least one qubit;

access qubit metadata that describes characteristics of a first plurality of qubits implemented by a first quantum computing system to identify a first qubit that is available to be reserved;

modify the qubit metadata to reserve the first qubit for the period of time to thereby inhibit access to the first qubit by any quantum application other than the first quantum application;

subsequent to modifying the qubit metadata to reserve the first qubit, determine, by the first computing system, that the first quantum application did not utilize the first qubit within the period of time; and modify the qubit metadata to unreserve the first qubit and allow access to the first qubit by other quantum applications.

* * * * *